Oct. 25, 1932.  W. A. TIBBETTS  1,884,389
COMBINED AUTOMOBILE HEATER AND WINDSHIELD WARMER
Filed April 28, 1931  2 Sheets-Sheet 1
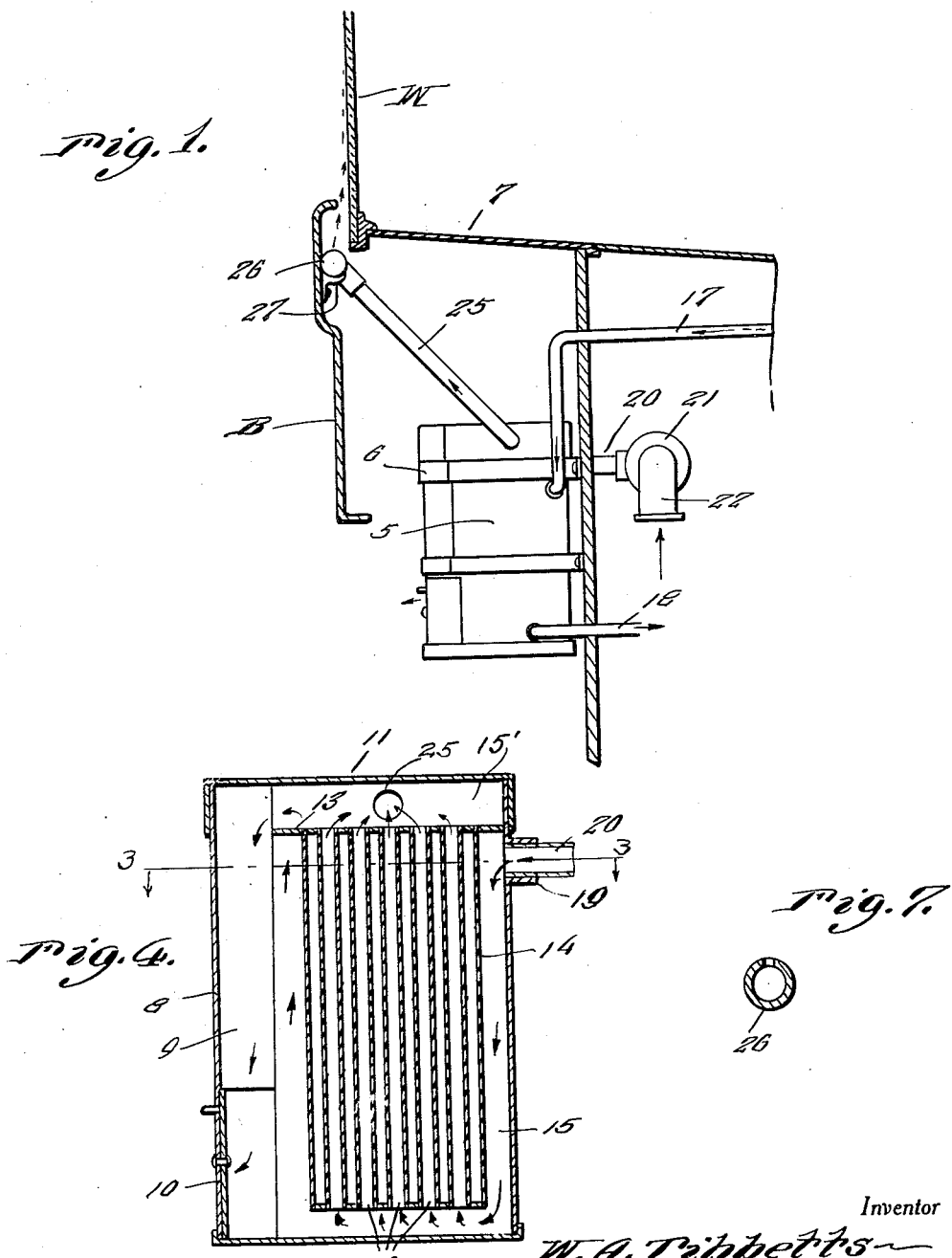
Inventor
W. A. Tibbetts
By Clarence A. O'Brien
Attorney Oct. 25, 1932.    W. A. TIBBETTS    1,884,389
COMBINED AUTOMOBILE HEATER AND WINDSHIELD WARMER
Filed April 28, 1931    2 Sheets-Sheet 2
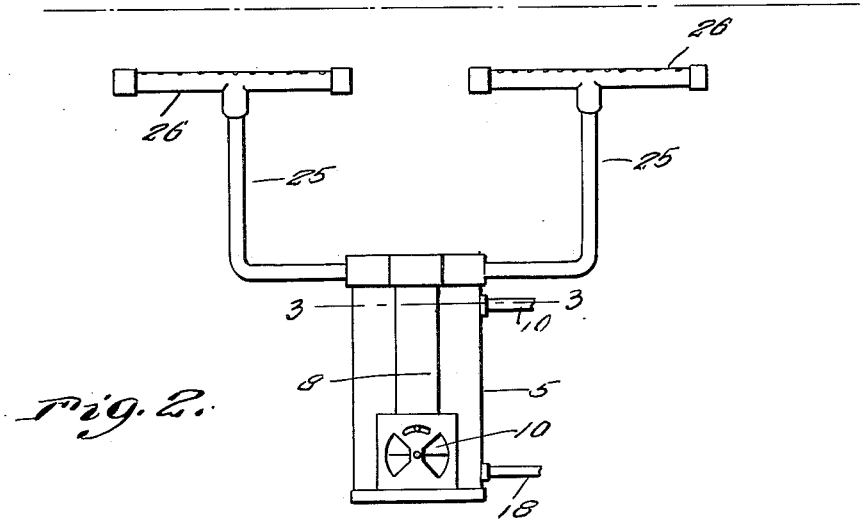
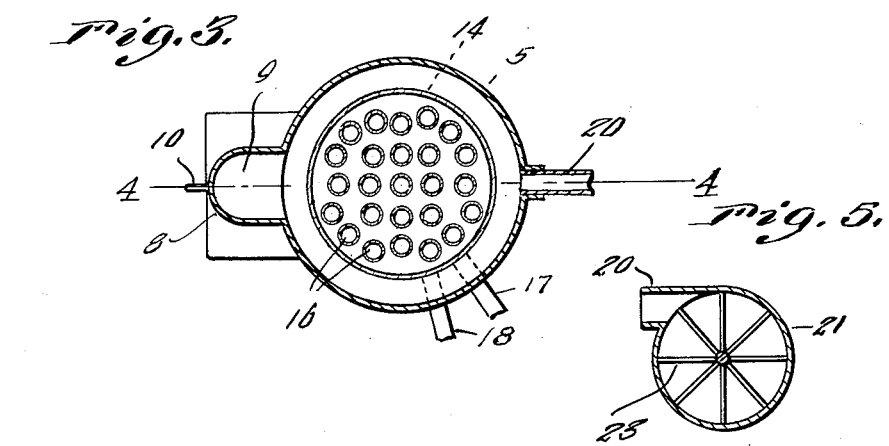
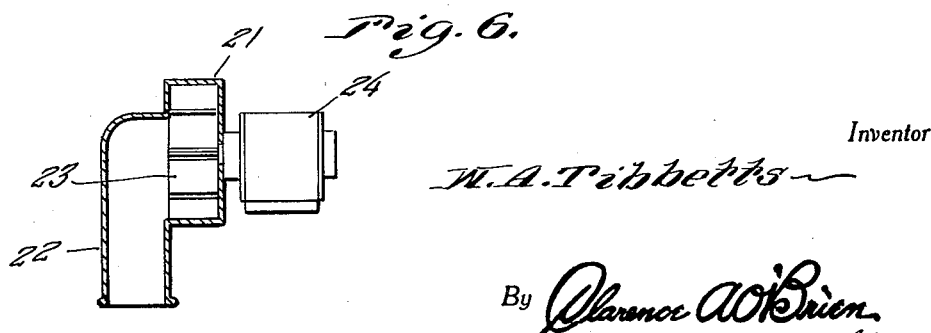
Inventor
W. A. Tibbetts
By Clarence A. O'Brien
Attorney Patented Oct. 25, 1932

1,884,389

UNITED STATES PATENT OFFICE

WINNIE A. TIBBETTS, OF RANGELEY, MAINE

COMBINED AUTOMOBILE HEATER AND WINDSHIELD WARMER

Application filed April 28, 1931. Serial No. 533,555.

The object of this invention is to provide a device for directing heated air into the interior of an automobile for warming the interior, and for also, and at the same time, direct heated air on to the windshield for warming the latter to thus prevent accumulation of ice, snow and sleet on the windshield, permitting the snow, ice and sleet to be readily scraped from the windshield by the usual windshield wiper thus insuring a clear vision area on the windshield for the operator of the vehicle at all times.

A still further object of the invention is to provide a device of the above mentioned character, which will permit of the utilization of the heated water from the circulating system of the automobile for heating the air to be directed inwardly of the automobile and on to the windshield of the automobile.

A still further object of the invention is to provide in a device of the character above mentioned, means for causing a forced circulation of air through the air heating device of the heater.

A still further object of the invention is to provide a device of the character above mentioned, which can be readily and easily mounted on the automobile beneath the cowl thereof, thus requiring material alterations in the construction of the automobile and further, without utilizing a great deal of space.

Other objects and advantages of the invention will become apparent from a study of the following description, taken in connection with the accompanying drawings wherein:

Figure 1 is a side elevational view of the device, the same being shown mounted in position on the automobile.

Figure 2 is a front view of the device per se.

Figure 3 is a horizontal transverse sectional view taken substantially on the line 3—3 of Figure 4.

Figure 4 is a vertical transverse sectional view taken substantially on the line 4—4 of Figure 3.

Figure 5 is a detail sectional elevational view taken through the blower forming part of the invention.

Figure 6 is a detail sectional elevational view taken through the blower and taken at substantially right angles to Figure 5.

Figure 7 is a transverse sectional view taken through one of the apertured discharge pipes forming part of the invention.

With reference more in detail to the drawings, it will be seen that my combined automobile heater windshield warmer comprises an outer substantially cylindrical casing 5 adapted to be suitably supported by brackets 6 beneath the cowl 7 of an automobile, a portion of which is shown in Figure 1. The casing 5 at the front thereof is provided with a radial extension 8 extending for substantially the full length of the casing 5 and providing with an adjacent portion of the peripheral wall of the casing 5 a hot air exhaust chamber 9, and from which hot air is exhausted into the interior of the automobile, through a valve control hot air discharge port 10 provided in the lower end of the extension 8.

A suitable cap 11 common to the cylinder or casing 5 and the extension is provided for closing the upper end of said casing and extension.

The cylinder or casing 5 adjacent the upper end thereof is provided with a transverse partition 13 which divides the said casing into lower and upper chambers 15 and 15'. The said partition 13 forms a tube plate and provides a support for an inner cylinder 14 that is spaced at its sides and bottom from the cylinder 5.

Arranged vertically within the inner cylinder 14 is a plurality of relatively spaced tubes or pipes 16 open at their upper and lower ends so that air in the chamber 15 passes upwardly through the tubes 16 and chamber 15' into the chamber 9 to exhaust through the port 10 of the chamber 9 into the interior of the car for heating the same.

For heating the air passing through the tube 16, heated water from the circulating system of the automobile is conducted by a pipe 17 extending through the cylinder 5 and connected with the cylinder 14, and the water in the cylinder 14 is returned to the circulating system through the medium of a pipe 18 leading from the outlet of the cylinder 14 so that as is apparent, the hot water is being continuously fed into the cylinder 14 and as the water in the cylinder 14 cools, it is drawn back into the circulating system of the automobile.

The cylinder or outer casing 5 is provided with an inlet 19 with which is coupled the outlet 20 of a fan casing 21. Fan casing 21 is provided with an air inlet 22 opening to the atmosphere, and arranged within the fan casing 21 is a fan 23 driven by an electric motor 24 suitably mounted adjacent the casing 21. Thus it will be seen, that when the fan is driven from the motor 24, air will be sucked into the casing 21 and subsequently forced into the casing and the chamber 15 to pass upwardly through the tubes 16 heated by contact with the walls of the tubes which of course are heated by the water in the cylinder 14. The heated air passes upwardly through the tubes and certain of the heated air as before mentioned passes into the chamber or compartment 9 and subsequently passes into the interior of the car.

Also, certain of the heated air passes from the top of the casing 5 through outlet pipes 25 extending from opposite sides of the casing or outer cylinder 5. Each of the pipes 25 at its upper free end is provided with a discharge nozzle 26 that is in the nature of a perforated pipe of suitable length closed at its ends and intermediate its end suitably connected with a pipe 25.

The pipes 25 extend forwardly and upwardly from the casing 5 and the nozzles 26 thereof are supported by suitable brackets 27 rearwardly of the instrument board B so that the heated air discharged from the nozzles 26 will pass upwardly to impinge upon the windshield W for heating the windshield, and consequently preventing snow, ice, sleet and the like freezing and accumulating on the windshield.

The temperature of the interior of the automobile can of course be controlled by regulating the valve 10, and when it is desired not to use the device, current to the motor 24 may be cut off by any suitable switch means not shown.

Even though I have herein shown and described the preferred embodiment of the invention, it will be understood that the same is susceptible of changes, modifications and improvements coming within the scope of the appended claims.

Having thus described my invention, what I claim as new is:

1. In a heater for automobiles, a vertical casing provided at a point below the upper end thereof, with a partition defining upper and lower chambers, a heating cylinder suspended from said partition and positioned within said lower chamber in spaced relation to the side and bottom walls thereof, said cylinder being provided with vertical air passages establishing communication between air chambers, the lower chamber having an air inlet and the upper chamber being formed with an air outlet, said casing being provided with an external longitudinal radial extension forming a passageway communicating at the upper portion thereof with said upper chamber and being provided at the lower portion thereof with an outlet.

2. In a heater for automobiles, a vertical casing provided at a point below the upper end thereof, with a partition defining upper and lower chambers, a heating cylinder suspended from said partition and positioned within said lower chamber in spaced relation to the side and bottom walls thereof, said cylinder being provided with vertical air passages establishing communication between air chambers, the lower chamber having an air inlet and the upper chamber being formed with an air outlet, said casing being provided with an external longitudinal radial extension forming a passageway communicating at the upper portion thereof with said upper chamber and being provided at the lower portion thereof with an outlet, and a cover detachably secured to said casing and covering the upper chamber thereof and the upper portion of said passageway.

In testimony whereof I affix my signature.

WINNIE A. TIBBETTS.